United States Patent [19]

Itatani et al.

[11] Patent Number: 4,717,494

[45] Date of Patent: Jan. 5, 1988

[54] LIQUID THERMAL ACCUMULATOR COMPOSITION AND THERMAL ACCUMULATION PROCESS

[75] Inventors: Hiroshi Itatani; Mikito Kashima; Masami Aikawa, all of Ichihara, Japan

[73] Assignee: UBE Industries, Ltd., Ube, Japan

[21] Appl. No.: 878,317

[22] Filed: Jun. 25, 1986

[30] Foreign Application Priority Data

Jun. 28, 1985 [JP] Japan .................... 60-143368

[51] Int. Cl.$^4$ ............................. C09K 5/06
[52] U.S. Cl. ............................. 252/70; 62/4; 165/104.12; 560/80; 560/87; 560/98; 560/120; 560/121; 560/127; 560/190; 560/197
[58] Field of Search ............ 252/20; 62/4; 165/104.12; 560/80, 87, 98, 120, 121, 127, 190, 197

[56] References Cited

U.S. PATENT DOCUMENTS

| | | | |
|---|---|---|---|
| 2,076,111 | 4/1937 | Bannister | 560/98 |
| 2,091,241 | 8/1937 | Kvalnes | 560/98 |
| 4,100,091 | 7/1978 | Powell | 252/70 |
| 4,161,210 | 7/1979 | Reid et al. | 62/4 |

FOREIGN PATENT DOCUMENTS 1078147  3/1960  Fed. Rep. of Germany ............ 165/104.12

*Primary Examiner*—Robert A. Wax
*Attorney, Agent, or Firm*—Frishauf, Holtz Goodman & Woodward

[57] ABSTRACT

A liquid thermal accumulator composition comprising a dicarboxylic acid anhydride, an alcohol and a monoester of the dicarboxylic acid and the alcohol. A process for accumulation of thermal energy utilizing said composition is also disclosed.

12 Claims, 2 Drawing Figures

LIQUID THERMAL ACCUMULATOR COMPOSITION AND THERMAL ACCUMULATION PROCESS

BACKGROUND OF THE INVENTION

1. Field of the Invention

This invention relates to a liquid thermal accumulator composition and a process for accumulation of thermal energy utilizing said liquid composition. More particularly, this invention relates to a liquid thermal accumulator composition for accumulating therein thermal energy in the form of chemical energy and a thermal accumulation process utilizing the same.

2. Description of Prior Arts

A variety of thermal accumulation processes, namely, processes for accumulation of thermal energy, are heretofore known. The known processes can be classified into various processes, for instance, a process of accumulation of thermal energy in a medium in the form of sensible heat such as a process using an oily medium; a process of accumulation of thermal energy in a medium in the form of latent heat such as a process using paraffin; and a process of accumulation of thermal energy in the form of chemical energy such as a process employing ammonia. Among these processes, the process of accumulation of heat energy in the form of chemical energy, namely chemical heat-accumulation process, is very favorable in practice, because it is high in the density of thermal energy accumulation and is free from escape of thermal energy in the storage, whereby it is capable of keeping the thermal energy for a long period of time with almost no heat loss.

Heretofore, the chemical heat-accumulation process has been studied mainly on processes in which production of gas by thermal decomposition of a solid inorganic material is involved. In more detail, previously the study of the chemical heat-accumulation process has been made mainly for utilizing reaction systems which comprise production of gas such as steam, carbon dioxide, ammonia or hydrogen.

However, the chemical heat-accumulation processes involving production of gas from a solid material have drawbacks in that:

(1) a heat source of a high temperature is required to accumulate thermal energy;

(2) it is difficult to stably operate the involved heat accumulation cycle for a long period of time;

(3) there is a problem in thermal conductivity because the solid-gas composition system is involved;

(4) apparatus of a large size is required; and (5) the apparatus is apt to be corroded.

Chemical heat-accumulation processes using organic materials have been also studied. Most of these studies have been made on chemical reaction systems likewise involving production of gas. Therefore, these processes are likewise not free from the drawbacks described above.

SUMMARY OF THE INVENTION

It is an object of the present invention to provide an improved thermal accumulation composition and an improved process for accumulation of thermal energy utilizing chemical reaction.

It is another object of the invention to provide a novel thermal accumulation composition and a novel process for accumulation of thermal energy utilizing chemical reaction which are so improved as to be substantially free from the drawbacks attached to the conventional thermal accumulation systems.

It is a further object of the invention to provide a thermal accumulation composition and a process for accumulation of thermal energy utilizing chemical reaction which are favorably employable for a long term operation and can utilize thermal energy of relatively low temperature.

There is provided by the present invention a liquid thermal accumulator composition comprising a diacarboxylic acid anhydride, an alcohol and a monoester of the dicarboxylic acid and the alcohol.

The above-mentioned liquid thermal accumulator composition is employable for thermal accumulation in a process which comprises separating a portion of the alcohol from the liquid composition with supplying thermal energy to the liquid composition from an outside energy source, whereby producing a composition containing an increased amount of the dicarboxylic acid anhydride.

In the above process, the alcohol separated from the liquid composition include an alcohol present in the original composition as well as an alcohol produced by dealcohol reaction occurring along displacement of the equilibrium involved.

Recovery of the accumulated thermal energy can be done at an optional stage by making the separated materials, namely, the separated alcohol and the composition comprising the dicarboxylic acid anhydride and the dicarboxylic acid monoester, together so as to generate an exothermic reaction.

DETAILED DESCRIPTION OF THE INVENTION

Figure 1:
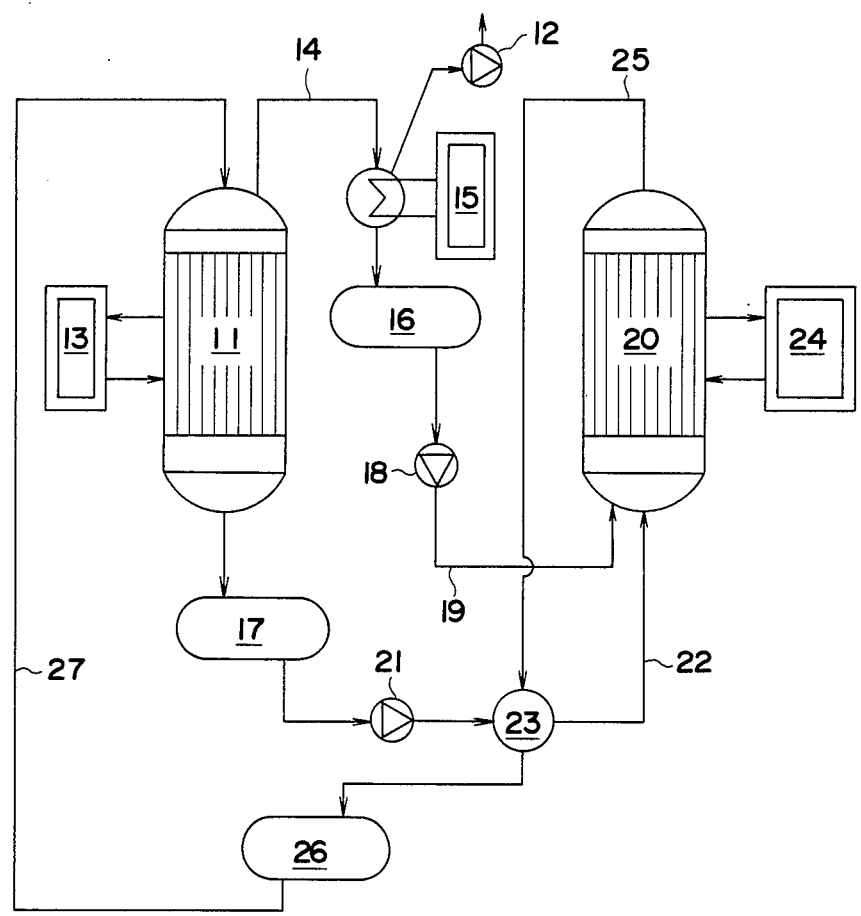
FIG. 1 is a schematic view of an apparatus for thermal accumulation which is employable for performing the process for accumulation of thermal energy according to the present invention.

The process for accumulation of thermal energy according to the present invention utilizes the following equilibrium reaction system which involves a dicarboxylic acid anhydride, an alcohol, and a monoester of the dicarboxylic acid:

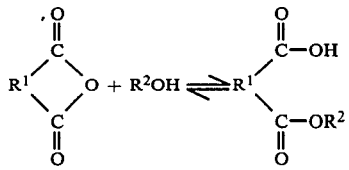

In the above formulae, $R^1$ is a group forming together with the adjoining —C—O—C— chain a four- or five-membered heterocyclic ring, and $R^2$ is a residue of an alcohol.

There is no specific limitation on the dicarboxylic acid anhydride employable in the present invention. A variety of known dicarboxylic acid anhydrides can be employed. Examples of the employable dicarboxylic acid anhydrides include the following compounds:

maleic anhydride and anhydride of a maleic acid derivative, for instance, maleic anhydride, 1-methylmaleic anhydride, and 2,2-dichloromaleic anhydride;

malonic anhydride and anhydride of a malonic acid derivative, for instance, malonic anhydride, phenylmalonic anhydride and propylmalonic anhydride;

succinic anhydride and anhydride of a succinic acid derivative, for instance, succinic anhydride and 1,2-dimethylsuccinic anhydride;

cyclohexanedicarboxylic [1,2] anhydride and anhydride of a cyclohexanedicarboxylic [1,2] acid derivative, for instance, 1,2-cyclohexanedicarboxylic anhydride and anhydride of 4,5-dichlorocyclohexanedicarboxylic [1,2] acid;

cyclohexene-1-dicarboxylic [1,2] anhydride;

cyclohexene-4-dicarboxylic [1,2] anhydride;

cyclopentanedicarboxylic [1,2] anhydride;

5-norbornenedicarboxylic [2,3] anhydride;

norbornadienedicarboxylic [2,3] anhydride and anhydride of a norbornadienedicarboxylic [2,3] acid derivative, for instance, norbornadienedicarboxylic [2,3] anhydride and anhydride of 5,6-dibromonorbornadienedicarboxylic [2,3] acid;

phthalic anhydride and anhydride of a phthalic acid derivative, for instance, phthalic anhydride, 4-methylphthalic anhydride, 4-carboxyphthalic anhydride, 3-carboxyphthalic anhydride, tetrachlorophthalic anhydride, pyromellitic anhydride, and biphenyltetracarboxylic anhydride; and naphthalenedicarboxylic anhydride, and anhydride of a naphthalenedicarboxylic acid derivative, for instance, 1,2-naphthalenedicarboxylic anhydride and 1,9-naphthalenedicarboxylic anhydride.

The dicarboxylic acid anhydrides can be employed singly or in combination.

Most preferred dicarboxylic acid anhydrides are 1,2-cyclohexanedicarboxylic anhydride, anhydride of a cyclohexanedicarboxylic [1,2] acid derivative, norbornadienedicarboxylic [2,3] anhydride, phthalic anhydride, and anhydride of a phthalic acid derivative.

There is also no specific limitation on the alcohol employable in the invention, so long as the alcohol is separatable from a mixture of the dicarboxylic acid anhydride and the monoester of the dicarboxylic acid by distillation, separation using a membrane, precipitation, or the like. Aliphatic alcohols and other alcohols having an aromatic group, an alicyclic group or a heterocyclic group can be employed. Dihydric alcohols, trihydric alcohols and alcohols having more hydroxyl groups can be employed. The alcohol may be a primary alcohol, a secondary alcohol or a tertiary alcohol.

Examples of the alcohols include methanol, ethanol, n-propanol, sec-propanol, n-butanol, sec-butanol, tert-butanol, octyl alcohol, 2-chloroethanol, cyclohexanol, benzyl alcohol, mesityl alcohol, norbornyl alcohol, β-nitroisobutyl alcohol, neopentyl alcohol, 1-methylbutyl alcohol, 1,2,2-trimethylbutyl alcohol, 2,2-diethylpropyl alcohol, ethylene glycol, methyl cellusolve, glycerol and furfuryl alcohol.

It has been noted that, in the chemical accumulation process for the accumulation of thermal energy using the liquid composition of the invention, the reaction rate of the endothermic reaction (i.e., thermal energy accumulation reaction) is an important factor to define the efficiency of the thermal accumulation system. For instance, a high reaction rate of the reaction system enables the use of a small-sized reaction vessel. From this viewpoint, fluorine atom-containing alcohols are advantageously employed.

Examples of the fluorine atom-containing alcohols include monofluoroethanol, trifluoroethanol, perfluoroethanol, tetrafluoropropanol, hexafluoro-sec-propanol, heptafluorobutanol, and octafluoropentanol.

The alcohol preferably has a boiling point in the range of 50° to 300° C. An alcohol having such low boiling point is advantageous in the case that the alcohol is to be separated from the composition by distillation. Particularly preferred is a lower aliphatic alcohol having a boiling point in the range of 50° to 150° C.

More preferred alcohol is a fluorine atom-containing alcohol having a boiling point in the range of 50° to 150° C.

The alcohols can be employed singly or in combination.

The composition for thermal accumulation of the present invention is a liquid thermal accumulator composition comprising a dicarboxylic acid anhydride, an alcohol and a monoester of the dicarboxylic acid and the alcohol. In the liquid thermal accumulator composition of the invention, the monoester of dicarboxylic acid and the dicarboxylic acid anhydride are preferably contained in a molar ratio of from 99:1 to 60:40 (monoester:anhydride). More preferably, the molar ratio ranges from 99:1 to 80:20. The preferred composition is easily obtained by admixing the dicarboxylic acid anhydride and the alcohol at a reaction temperature to produce an equilibrium composition containing the monoester of dicarboxylic acid.

The above composition preferably contains a catalyst for accelerating the equilibrium reaction between the composition of the dicarboxylic acid anhydride and the alcohol and the monoester of dicarboxylic acid. Examples of the catalyst include inorganic acids such as hydrochloric acid and sulfuric acid, inorganic alkaline compounds such as sodium hydroxide, organic acids such as p-toluenesulfonic acid, organic bases such as triethylamine, Lewis acids such as iron chloride, aluminum chloride and copper sulfide, and ion exchange resins.

The thermal accumulator composition of the invention necessarily is in the form of a liquid. In the case that the mixture of dicarboxylic acid anhydride and alcohol is a solid mixture, an appropriate solvent is employed for changing the solid mixture into a solution. The appropriate solvent is an organic solvent having a higher boiling point than that of the alcohol employed. Examples of the solvent include ethylene glycol dialkyl ether, diethylene glycol dialkyl ether and triethylene glycol dialkyl ether, in which the alkyl group contains 1–8 carbon atoms.

The thermal accumulator composition of the present invention can be used in a process for chemical accumulation of thermal energy which comprises separating a portion of the alcohol from the liquid composition with supplying thermal energy to the liquid composition from an outside energy source. The separation can be performed using a known separation procedure such as distillation, separation through membrane, or precipitation. There is no specific limitation on the outside energy source. Waste heat and solar energy are preferably used because the thermal energy accumulation process of the invention can effectively utilize heat sources of relatively low temperature.

The thermal energy accumulation process of the present invention is described below with reference to the attached drawing.

FIG. 1 illustrates a schematic view of an apparatus which is employable for performing the process of thermal energy accumulation according to the invention.

In the apparatus of FIG. 1, the liquid thermal accumulation composition of the invention comprising a dicarboxylic acid anhydride, an alcohol and a monoester of dicarboxylic acid is initially charged into endothermic reaction vessel 11. The endothermic reaction vessel is equipped with vacuum pump 12 and heat source 13. Pressure in the endothermic reaction vessel 11 is reduced by means of the vacuum pump 12 with supply of thermal energy (i.e., heat) from the heat source 13 to the reaction vessel 11. Under the reduced pressure, an alcohol (i.e., an alcohol present in the original composition as well as an alcohol produced by de-alcohol reaction occurring in the progress of displacement of the equilibrium involved) is selectively distilled from the liquid composition, and supplied to cooling system 15 via line 14. The distilled alcohol gas is cooled into a liquid in the cooling system 15 and stored in tank 16.

Along with the above procedure, the equilibrium of the liquid composition in the reaction vessel 11 is displaced to give a liquid composition consisting mainly of the dicarboxylic acid anhydride together with the monoester of dicarboxylic acid (hereinafter referred to as "dicarboxylic acid anhydride-rich liquid composition). The dicarboxylic acid anhydride-rich liquid composition is recovered and stored in tank 17.

In the course of the above process, the thermal energy supplied from the heat source 13 is accumulated within the alcohol and the dicarboxylic acid anhydride-rich liquid composition stored in the tank 16 and the tank 17, respectively.

The accumulated thermal energy can be recovered by the following process.

The alcohol in the tank 16 is sent to exothermic reaction vessel 20 via line 19 by means of liquid-supply pump 18. Simultaneously, the dicarboxylic acid anhydride-rich liquid composition in the tank 17 is sent to the exothermic reaction vessel 20 via line 22 by means of liquid-supply pump 21. The dicarboxylic acid anhydride-rich liquid composition is subjected to heat exchange with a liquid solution taken out of the exothermic reaction vessel 20 in heat exchanger 23 provided in the line 22.

The alcohol and the dicarboxylic acid anhydride-rich liquid composition are immediately mixed in the exothermic reaction vessel 20 to undergo exothermic reaction. Thermal energy produced by the exothermic reaction is recovered by heat recovery device 24 attached to the reaction vessel 20, and the recovered heat is employed for a desired purpose.

The exothermic reaction is based on a reaction in which the alcohol reacts with the dicarboxylic acid anhydride to yield a monoester of the dicarboxylic acid. With the progress of the exothermic reaction, the liquid composition in the exothermic reaction vessel 20 turns into a liquid composition consisting mainly of the monoester of dicarboxylic acid together with the alcohol and the dicarboxylic acid anhydride (hereinafter referred to as "dicarboxylic acid monoester-rich liquid composition).

The dicarboxylic acid monoester-rich liquid composition is sent to tank 26 via line 25 and stored in the tank 26. The dicarboxylic acid monoester-rich liquid composition is pre-heated in the heat exchanger 23 arranged in the line 25.

The dicarboxylic acid monoester-rich liquid composition in the tank 26 may be immediately sent to the endothermic reaction vessel 11 via line 27. Otherwise, the composition is kept in the tank 26, and sent to the reaction vessel 11 at an appropriate time when the thermal energy accumulation is required.

In the above process, the separation of alcohol is done by distillation. However, as stated hereinbefore, the separation can be done by other procedures such as separation by membrane or precipitation. Nevertheless, the separation of alcohol is advantageously done by distillation in the industrial process.

The present invention is further described by the following examples.

EXAMPLE 1

In a 300 ml volume-glass vessel equipped with an inner cooling tube and an outer cooling tube were placed 75.75 g. (0.4914 mol.) of 1,2-cyclohexanedicarboxylic anhydride and 36.42 g. (0.4914 mol.) of sec-butanol, and the vessel was placed in an oil bath at 140° C. Exothermic reaction immediately took place. The reaction mixture attained equilibrium after 1.5 hrs. In the equilibrated reaction mixture were present 4.35 g. (0.0282 mol.) of 1,2-cyclohexanedicarboxylic anhydride, 2.09 g. (0.0282 mol.) of sec-butanol, and 105.73 g. (0.4632 mol.) of monobutylester of 1,2-cyclohexanedicarboxylic acid.

The equilibrated reaction mixture had an increased temperature of 210° C.

The reaction mixture was cooled to 180° C., and placed under reduced pressure at 10 mmHg to distill sec-butanol out of the reaction mixture. As the distillation proceeded, endothermic de-butanol reaction took place. The distillation was continued for 8 hrs. The resulting reaction mixture comprised 55.40 g. (0.3594 mol.) of 1,2-cyclohexanedicarboxylic anhydride and 30.13 g. (0.1320 mol.) of the monobutylester. The distilled sec-butanol amounted to 26.64 g. (0.3594 mol.).

The reaction mixture of 1,2-cyclohexanedicarboxylic anhydride and the monobutylester was mixed with the distilled sec-butanol at 140° C. Immediately, an exothermic reaction took place in the same way as above.

In another attempt based on the same reaction system in the first stage, 500 ml of water at initial temperature of 20° C. was circulated through the inner cooling tube during the period of exothermic reaction to keep the temperature of the reaction mixture at 140° C. When the reaction mixture attained equilibrium, the cooling water had an increased temperature of 28° C.

Thus, it has been confirmed that a composition comprising 1,2-cyclohexanedicarboxylic anhydride, monobutylester of 1,2-cyclohexanedicarboxylic acid and sec-butanol is employable in cycle as material for accumulation of thermal energy.

EXAMPLE 2

In the same glass vessel as in Example 1 were placed 75.00 g. (0.5064 mol.) of phthalic anhydride and 37.53 g. (0.5064 mol.) of n-butanol, and the vessel was placed in an oil bath at 140° C. Exothermic reaction immediately took place. The reaction mixture attained equilibrium after 30 min. In the equilibrated reaction mixture were present 8.26 g. (0.0558 mol.) of phthalic anhydride, 4.13 g. (0.0558 mol.) of n-butanol, and 100.14 g. (0.4506 mol.) of monobutylester of phthalic acid.

The equilibrated reaction mixture had an increased temperature of 190° C.

The reaction mixture was cooled to 150° C., and placed under reduced pressure at 10 mmHg to distill n-butanol out of the reaction mixture. As the distillation proceeded, endothermic de-butanol reaction took place. The distillation was continued for 5 hrs. The resulting reaction mixture comprised 67.49 g. (0.4557 mol.) of phthalic anhydride and 11.27 g. (0.0507 mol.) of the monobutylester. The distilled n-butanol amounted to 33.77 g. (0.4557 mol.).

The reaction mixture of phthalic anhydride and the monobutylester was mixed with the distilled n-butanol at 140° C. Immediately, an exothermic reaction took place in the same way as above.

Thus, it has been confirmed that a composition comprising phthalic anhydride, monobutylester of phthalic acid and n-butanol is employable in cycle as material for accumulation of thermal energy.

EXAMPLE 3

In a 100 ml volume-glass vessel equipped with an inner cooling tube and an outer cooling tube were placed 25.00 g. (0.1623 mol.) of 1,2-cyclohexanedicarboxylic anhydride and 12.02 g. (0.1624 mol.) of n-butanol, and the vessel was placed in an oil bath at 140° C. Exothermic reaction immediately took place. The reaction mixture attained equilibrium after 2 hrs. In the equilibrated reaction mixture were present 1.45 g. (0.0094 mol.) of 1,2-cyclohexanedicarboxylic anhydride, 0.70 g. (0.0095 mol.) of n-butanol, and 34.86 g. (0.1529 mol.) of monobutylester of 1,2-cyclohexanedicarboxylic acid.

The equilibrated reaction mixture had an increased temperature of 207° C.

The reaction mixture was cooled to 140° C., and placed under reduced pressure at 10 mmHg to distill n-butanol out of the reaction mixture. As the distillation proceeded, endothermic de-butanol reaction took place. The distillation was continued for 8 hrs. The resulting reaction mixture comprised 3.496 g. (0.0227 mol.) of 1,2-cyclohexanedicarboxylic anhydride and 31.85 g. (0.1395 mol.) of the monobutylester. The distilled n-butanol amounted to 1.68 g. (0.0227 mol.). The de-butanol ratio attained by the endothermic reaction (heat accumulation reaction) for 8 hrs. was 14%.

To the equilibrated reaction mixture was added 2 g. (1.8 m.eq.) of a sulfonic acid-type catalyst (Nafion 117, available from E. I. Du Pont de Nemours and Company). The resulting mixture was again placed under reduced pressure at 10 mmHg to further remove n-butanol out of the reaction mixture. The de-butanol reaction again took place, and n-butanol was distilled. The distillation was continued for 5.5 hrs. The residue comprised 16.23 g. (0.1054 mol.) of 1,2-cyclohexanedicarboxylic anhydride and 12.96 g. (0.0568 mol.) of the monobutylester. The distilled n-butanol amounted to 7.80 g. (0.1054 mol.). The de-butanol ratio attained by the second endothermic reaction (heat accumulation reaction) for 5.5 hrs. was 65%.

The reaction mixture of 1,2-cyclohexanedicarboxylic anhydride and the monobutylester was mixed with the distilled n-butanol at 140° C. Immediately, an exothermic reaction took place in the same way as above.

Thus, it has been confirmed that a composition comprising 1,2-cyclohexanedicarboxylic anhydride, monobutylester of 1,2-cyclohexanedicarboxylic acid and n-butanol is employable in cycle as material for accumulation of thermal energy.

EXAMPLE 4

In a 50 ml volume-flask equipped with a cooling tube, a stirrer and a sampling tube were placed 25.0 g. (0.1623 mol.) of hexahydrophthalic anhydride and 16.22 g. (0.1622 mol.) of trifluoroethanol, and the vessel was placed in an oil bath at 150° C. Exothermic reaction immediately took place. The reaction mixture attained equilibrium after 1 hr. In the equilibrated reaction mixture was present 2.83 g. (0.0184 mol.) of hexahydrophthalic anhydride, 1.83 g. (0.0183 mol.) of trifluoroethanol, and 36.55 g. (0.1439 mol.) of monotrifluoroethylester of hexahydrophthalic acid.

The equilibrated reaction mixture had an increased temperature of 195° C.

The reaction mixture was cooled to 150° C., and placed under reduced pressure at 100 mmHg to distill trifluoroethanol out of the reaction mixture. As the distillation proceeded, endothermic de-butanol reaction took place. The distillation was continued for 2 hrs. The resulting reaction mixture comprised 16.12 g. (0.1047 mol.) of hexahydrophthalic anhydride and 14.63 g. (0.0576 mol.) of the monobutylester. The distilled trifluoroethanol amounted to 10.46 g. (0.1046 mol.).

The distilled trifluoroethanol was added to the above reaction mixture. Immediately, an exothermic reaction took place in the same way as above.

Thus, it has been confirmed that a composition comprising hexahydrophthalic anhydride, monotrifluoroethylester of hexahydrophthalic acid and trifluoroethanol is employable in cycle as material for accumulation of thermal energy.

EXAMPLE 5

Two endothermic reactions were carried out in the same manner as in Example 4 under the conditions set out in Table 1, using ethanol and trifluoroethanol, respectively.

TABLE

| Alcohol | Trifluoroethanol | Ethanol |
| --- | --- | --- |
| Anhydride | hexahydrophthalic anhydride | |
| Temperature for Exothermic reaction | 150° C. | 150° C. |
| Pressure | 10 mmHg | 10 mmHg |

Figure 2:
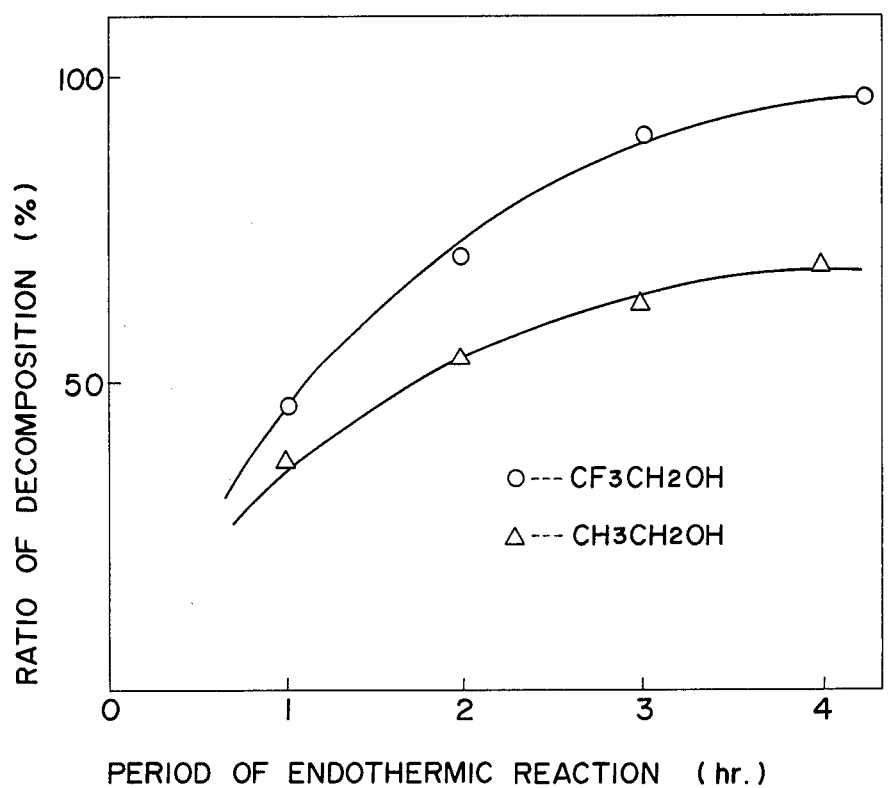
FIG. 2 is a graph indicating reaction rates of the same reactions except for employing different alcohols (ethyl alcohol vs. trifluoroethyl alcohol).

The results are graphically illustrated in FIG. 2. It is clear from the results that the use of trifluoroethanol as the alcohol component is more effective to enhance the reaction rate of the endothermic reaction than the case using ethanol.

What is claimed is:

1. A process for accumulation of thermal energy which comprises separating, from a liquid composition comprising a dicarboxylic acid anhydride, an alcohol and an ester of the dicarboxylic acid and the alcohol, a portion of the alcohol with supplying thermal energy to the liquid composition from an outside energy source, whereby producing a composition containing an increased amount of the dicarboxylic acid anhydride.

2. The process for accumulation of thermal energy as claimed in claim 1, wherein the liquid composition contains a catalyst for accelerating an equilibrium reaction between a composition of the dicarboxylic acid anhydride and the alcohol and the monoester of the dicarboxylic acid.

3. The process for accumulation of thermal energy as claimed in claim 1, wherein the dicarboxylic acid anhydride is selected from the group consisting of maleic anhydride, anhydride of a maleic acid derivative, malonic anhydride, anhydride of a malonic acid derivative, succinic anhydride, anhydride of a succinic acid derivative, cyclohexanedicarboxylic [1,2] anhydride, anhydride of a cyclohexanedicarboxylic [1,2] acid derivative, cyclohexene-1-dicarboxylic [1,2] anhydride, cyclohexene-4-dicarboxylic [1,2] anhydride, cyclopentanedicarboxylic [1,2] anhydride, 5-norbornenedicarboxylic [2,3] anhydride, norbornadienedicarboxylic [2,3] anhydride, anhydride of a norbornadienedicarboxylic [2,3] acid derivative, phthalic anhydride and anhydride of a phthalic acid derivative, naphthalenedicarboxylic acid, and anhydride of a naphthalenedicarboxylic acid derivative.

4. The process for accumulation of thermal energy as claimed in claim 1, wherein the alcohol is an alcohol having a boiling point in the range of 50° to 300° C.

5. The process for accumulation of thermal energy as claimed in claim 1, wherein the alcohol is a fluorine atom-containing alcohol having a boiling point in the range of 50° to 150° C.

6. The process for accumulation of thermal energy as claimed in claim 3 wherein the alcohol is a fluorine atom-containing alcohol having a boiling point in the range of 50° to 150° C.

7. The process for accumulation of thermal energy as claimed in claim 1 wherein the alcohol is monofluoroethanol, trifluoroethanol, perfluoroethanol, tetrafluoropropanol, hexafluoro-sec-propanol, heptafluorobutanol and octafluoropentanol.

8. The process for accumulation of thermal energy as claimed in claim 3 wherein the alcohol is monofluoroethanol, trifluoroethanol, perfluoroethanol, tetrafluoropropanol, hexafluoro-sec-propanol, heptafluorobutanol and octafluoropentanol.

9. The process for accumulation of thermal energy as claimed in claim 1 wherein the alcohol is a fluorinated ethanol.

10. The process for accumulation of thermal energy as claimed in claim 1 wherein the alcohol is a fluorinated propanol.

11. The process for accumulation of thermal energy as claimed in claim 1 wherein the alcohol is fluorinated butanol.

12. The process for accumulation of thermal energy as claimed in claim 1 wherein the alcohol is fluorinated pentanol.

* * * * *